Patented Mar. 31, 1942

2,278,207

UNITED STATES PATENT OFFICE 2,278,207

SPUN GLASS PRODUCTS

Kenneth N. Mathes, Schenectady, N. Y., assignor to General Electric Company, a corporation of New York No Drawing. Application September 16, 1939, Serial No. 295,334

4 Claims. (Cl. 91—68)

The present invention relates to glass fiber products and in particular to spun glass products wherein the glass fibers, in staple or continuous filament form, are coated with a sizing or binding agent comprising a mixture of polymerized isobutylene and metallic soap.

Spun glass (glass wool) products in the form of filaments, threads, matted or woven fabrics, tapes, etc. previously have been treated or coated with various sizing materials including hydrocarbons, such as starches, sugars, mineral oil, certain resins, and the like, and with various binders including starch and resinous or plastic compositions, such as phenolic resins, asphalts, and the like. The sizing materials, in general, have been too stiff or have been rather hygroscopic so that under humid conditions the electrical insulating value of the sized glass products was impaired while the usual binders, when used for instance on mats formed of glass fibers, have produced brittle products deficient in tear-resistance and flexibility.

I have discovered that if the spun glass in any of its various forms is coated with a mixture comprising polymerized isobutylene and metallic soap, the resultant article is particularly useful in the electrical art in that it is not only a good electrical insulator, but is also flexible, abrasion-resistant, moisture-resistant, non-tacky, and in matted or felted form, tear-resistant to a degree not previously attained in glass mats.

In accordance with my invention, the spun glass may be coated with the polyisobutylene-metallic soap coating material, as by spraying, dipping, brushing and the like, during any stage of its manufacture. Thus, the coating material may be applied by the usual methods to the glass filaments as a sizing and lubricating material after these filaments have been blown or drawn from the molten glass, or it may be applied to the glass fiber products for the purpose of increasing the strength and abrasion-resistance of these twisted, woven or matted products.

The fact that the polyisobutylene-metallic soap composition behaves both as a sizing or lubricating coating, and as a binder, is apparently due to the unusual combined properties of the composition. In functioning both as a binding and as a sizing or lubricating coating for the glass fibers, it appears to act primarily as a sizing material or lubricant in that it prevents the fibers from cutting or nicking one another although this lubricating action is modified to a desirable degree by the resiliency or binding action of the coating so there is little tendency for the individual fibers completely to disengage one another to the ultimate disintegration of the glass fiber product as a whole. Because of the combined binding and lubricating action of the composition, threads comprising the coated filaments or fibers are characterized by outstanding strength and abrasion-resistance and mats of spun glass fibers treated with this composition exhibit, in addition to the above properties, exceptional flexibility and tear-resistance.

The coating composition for the glass fibers may be prepared in a number of ways. For example, finely-powdered, water-insoluble metallic soap may be added to and suspended in a suitable polyisobutylene solution. In this method of compounding the coating material, the soap is added to a cold polyisobutylene solution and no heating is necessary to obtain the desired solution or suspension. Preferably the metallic soap is added to a more concentrated and hence more viscous polyisobutylene solution than that which ultimately will be required and this composition is allowed to stand for about one or two days after which it is diluted to a working concentration. By this method, a permanent suspension or solution of the soap in the polyisobutylene solution is obtained. In an alternative method, the metallic soap-polyisobutylene-solvent mixture may be heated for a short time to obtain the permanent suspension. As a more viscous material usually results when the mixture is heated, the latter method is preferred when it is desired to incorporate only a comparatively small quantity of the metallic soap in the polyisobutylene solution as will be described more fully hereinafter. Instead of naphtha solutions, emulsions of the metallic soap-polyisobutylene combination in water may be used to coat the fibers. Such emulsions may be prepared by using small amounts (about 2 per cent) of suitable emulsifying or stabilizing materials, such as ammonium hydroxide or triethanolamine.

The polyisobutylene-metallic soap composition, as applied to the glass fibers, ordinarily should contain not more than ten per cent, and preferably not more than about five per cent, of the metallic soap, and from about five to about ten per cent polyisobutylene. These proportions, however, will depend upon the method by which the coating composition has been prepared, the particular ingredients used, and the way in which the composition is to be employed. When the metallic soap is merely suspended in the cold polyisobutylene solution, the soap content ordinarily should be higher than when the heating step is used. For example, with equal polyisobutylene concentrations, from four to five per cent of the metallic soap used in the cold compound will produce a composition having approximately the same viscosity as that prepared with one per cent of the same soap when the ingredients are heated together. Although in the preferred form of the invention, the polyisobutylene ordinarily constitutes approximately five per cent by weight of the whole solution, the fact that the viscosity of the polyisobutylene solution varies with the amount of, and molecular weight of, the polymer present may necessitate some deviation from the preferred percentage in order that the viscosity may be such as to meet the requirements of any particular application.

Examples of the water-insoluble metallic soaps which may be used in the practice of this invention are the stearates, palmitates, oleates, arachidates and naphthenates of calcium, strontium, barium, magnesium, zinc, aluminum, cobalt, lead, etc. Best results have been obtained with compositions containing aluminum soaps, specifically aluminum stearate either as the sole soap component or mixed with other metallic soaps.

Any volatile liquid solvent capable of dissolving or dispersing the polyisobutylene may be used in preparing my composition provided this solvent is also capable of dissolving or dispersing a water-insoluble metallic soap such as aluminum stearate. I may use toluol or mixtures of toluol with a volatile alkyl ester, such as butyl acetate, although I prefer to use ordinary petroleum naphtha with or without the addition of a minor portion of toluol. Those solvents containing petroleum naphtha apparently tend to produce a final product having improved non-tacky properties.

After the glass fiber product has been treated with the solution of the metallic soap-polyisobutylene mixture, the solvent is removed, for instance, by heating the treated product for a short time at a temperature of approximately 150° C. or by allowing the product to stand a longer time at room temperature. If the composition is applied to already heated or warmed glass fibers, the application of additional heat is usually unnecessary.

The final glass fiber product is characterized by an increased tensile strength, abrasion-resistance and flexibility and, unlike the glass product treated with polyisobutylene alone, is free from any tackiness characterizing such polyisobutylene products.

The improvement in glass fiber materials which have been sized in accordance with this invention, as compared with unsized materials and materials sized with conventional sizing compositions, is shown by the following comparative test data:

Abrasion resistance

In testing for abrasion resistance an abrasion testing machine designed particularly for testing the abrasion resistance of enameled wires was used. This machine consists of 12 tungsten carbide rods, 3/8 inch diameter, arranged equidistant apart in parallel relation with the ends forming a circle six inches in diameter. The ends of these rods are attached at right angles to spaced apart parallel disk end plates. A single strand of 900—8/8 glass fiber yarn was placed about the upper half of the circumference of the drum formed by the above rods. One end of the glass fiber strand was held in fixed position and a suitable weight was attached to the loose other end. The drum, driven by a motor, was revolved at 60 R. P. M. and the number of turns of the drum required to produce breaking of the material was taken as a relative measure of its abrasion resistance.

*Abrasion resistance (turns to produce breaking)*

| Load | Conventional sized glass yarn | Aluminum stearate-polyisobutylene sized glass yarn |
|---|---|---|
| 600 | 380 | 2,400 |
| 1,000 | 97 | 560 |
| 2,000 | 17 | 76 |

*Coefficient of friction of 900—8/8 glass fiber against steel (sliding coefficient)*

| Load | Conventional sized glass yarn | Aluminum stearate-polyisobutylene sized glass yarn |
|---|---|---|
| 10 gms | 0.19 | 0.26 |
| 100 gms | 0.15 | 0.16 |
| 1,000 gms | 0.15 | 0.16 |

*Coefficient of friction of 900—8/8 glass fiber against glass (sliding coefficient)*

| Load | Conventional sized glass yarn | Aluminum stearate-polyisobutylene sized glass yarn |
|---|---|---|
| 10 gms | 0.43 | 0.42 |
| 100 gms | 0.27 | 0.25 |
| 1,000 gms | 0.17 | 0.17 |

*Coefficient of friction of 900—8/8 glass fiber against glass (static coefficient)*

| Load | Conventional sized glass yarn | Aluminum stearate-polyisobutylene sized glass yarn |
|---|---|---|
| 10 gms | 0.46 | 0.60 |
| 100 gms | 0.31 | 0.42 |
| 1,000 gms | 0.21 | 0.22 |

The superior electrical value of the sizing material forming the subject of this invention is evident from the following tests on samples of sized and unsized glass fiber tapes 0.005 inch thick and one inch wide which have been treated with oil-modified phenolic resin varnish, baked four hours at 150° C. and exposed 16 hours at 100 per cent relative humidity at 40° C. followed by one hour at 50 per cent relative humidity at 25° C.:

| | Megohms per inch |
|---|---|
| Conventional sizing | 2,600 |
| Aluminum stearate polyisobutylene sizing | 40,000 |
| No sizing | 14,000 |

The sized material used in the above comparative tests was the usual commercial glass fiber yarn now on the market containing the conventional sizing material.

The unsized material was obtained by treating commercial glass fiber yarn with boiling acetone after which it was boiled for 10 minutes in 5 per cent water solution of ammonium stearate and rinsed 5 times in boiling distilled water.

The aluminum stearate-polyisobutylene sized material was obtained by applying to the unsized material a composition prepared as follows: About 10 per cent aluminum stearate was thoroughly mixed with 20 per cent base content polyisobutylene in a napatha solvent. After the mixture had set for approximately one day, it was reduced by the addition of further solvent naphtha to a 5 per cent aluminum stearate, 10 per per cent polyisobutylene composition. The unsized yarn was sized by immersing it in this sizing solution and drying it at room temperature for 24 hours.

As the sized material is soft and pliable, it may be twisted into a thread and woven into a fabric, or formed into a mat by the usual methods with or without suitable drafting, rolling or compressing operations after which it may be treated again with a more viscous solution of the polyisobutylene and aluminum stearate functioning primarily as a binding agent.

The final product in the form of a thread or fabric may be used in the electrical art as a suitable insulation for electric conductors requiring a substantially inorganic insulation having good mechanical and electrical properties.

In the form of a felted or woven fabric, the products may be used alone or combined with other facing or backing materials as electrical insulation. For example, a treated glass mat may be used as a substitute for ordinary Japanese tissue as a backing material for mica tape. It may also replace the usual asbestos paper backing on mica slot wrappers with a resultant improved space factor and moisture-resistance. Tapes or ribbons comprising my improved product may be applied as a covering for wires, armature bars, coils, etc. in a manner similar to that employed at present with paper, cellulose acetate and other insulating materials. The polyisobutylene-metal soap bonded mats as such or in tape form have the desirable property not possessed by many of the prior art materials of considerable strength with enough "give" or elasticity to absorb unequal winding tensions. Furthermore, these products have greater resistance to abrasion and impact than the glass mats previously produced.

As the metallic soap-polyisobutylene composition is compatible with various impregnants, such as oil-modified varnishes, the coated glass fiber products of my invention are particularly useful where it is desired to further treat a glass fiber product with such impregnants for the purpose of further increasing its electrical resistance, etc.

The tear-resistance of the glass mats produced in accordance with my invention and in particular those mats wherein the individual strands of glass are cross-laminated makes them particularly useful in combination with other materials possessing low tear-strength. The treated mat may be laminated with mica, cellulose acetate sheets, and the like, or with other felted or matted glass layers, suitably sized and otherwise treated with binding materials, such as phenol-formaldehyde resins or other varnish-like materials.

The combination of a cellulose acetate backing and the polyisobutylene-metallic soap bonded glass mat is particularly useful for wire or cable wrapping using a suitable sticker, such as a solution of shellac or resin.

Obviously the coated glass fiber products of this invention are not limited to use as electrical insulation. For example, they may be used as thermal insulation, as filtering media, or wherever ordinary glass fiber materials are employed.

What I claim as new and desire to secure by Letters Patent of the United States is:

1. A strong, flexible, non-tacky, abrasion- and tear-resistant article of manufacture consisting of glass fibers coated with a composition consisting of approximately one part by weight of aluminum stearate and between one and two parts by weight of polyisobutylene.

2. An electrically insulating material comprising a fabric formed of woven glass fibers which are coated with a composition consisting of one part by weight of aluminum soap and from one to ten parts by weight of polyisobutylene, the said fabric being coated and impregnated with an electrically insulating oil-modified phenolic resin varnish.

3. The method of preparing a moisture-resistant, flexible glass fiber product which comprises coating the glass fibers with a composition consisting of one part by weight of aluminum stearate, one to ten parts by weight of polyisobutylene and a volatile solvent therefor, and evaporating the solvent from said composition.

4. A strong, flexible, abrasion- and tear-resistant article of manufacture comprising glass fibers coated with a composition consisting of approximately one part by weight of metallic soap and between one and ten parts by weight of polyisobutylene.

KENNETH N. MATHES.